Billy C. Malone
George E. Conover
INVENTORS

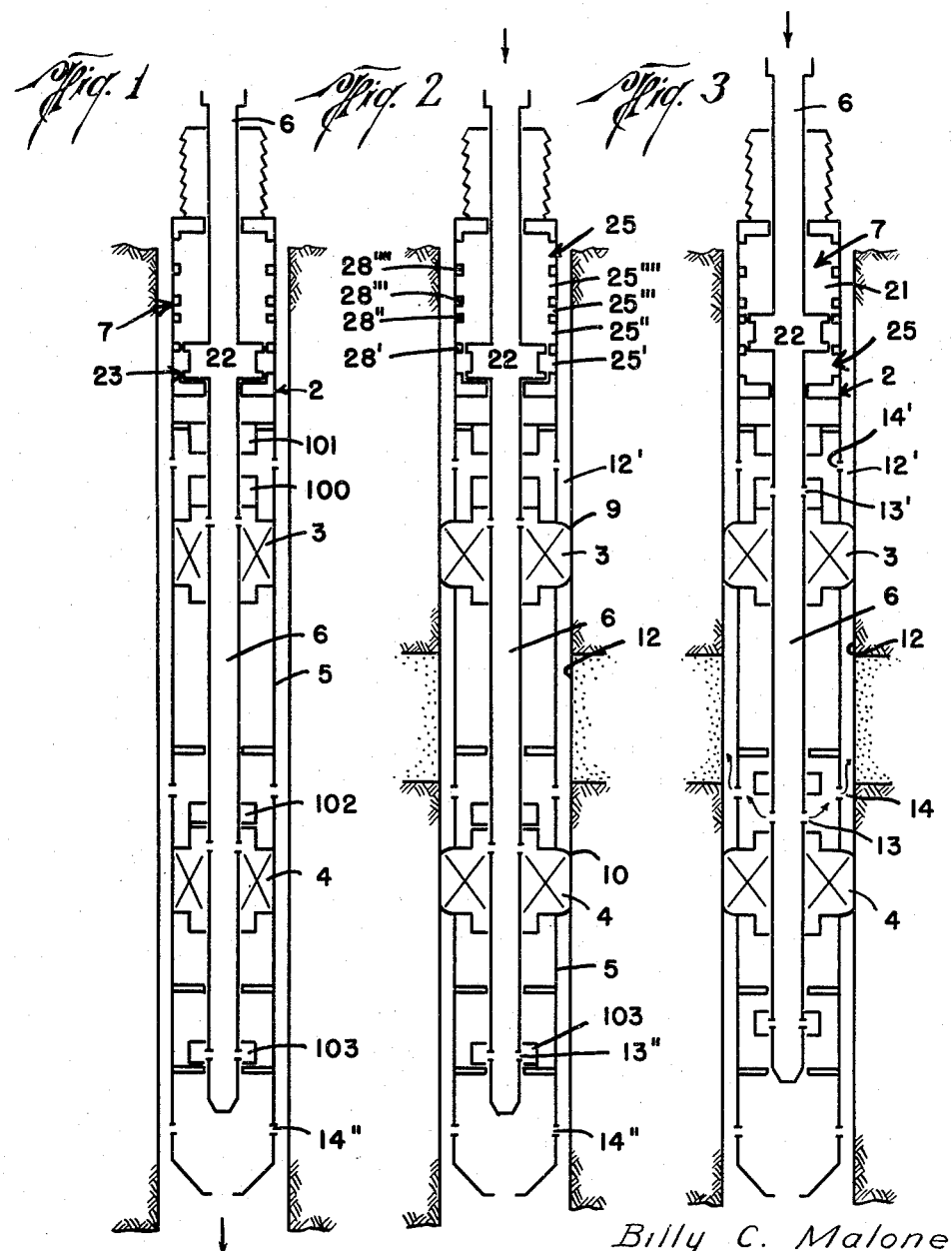

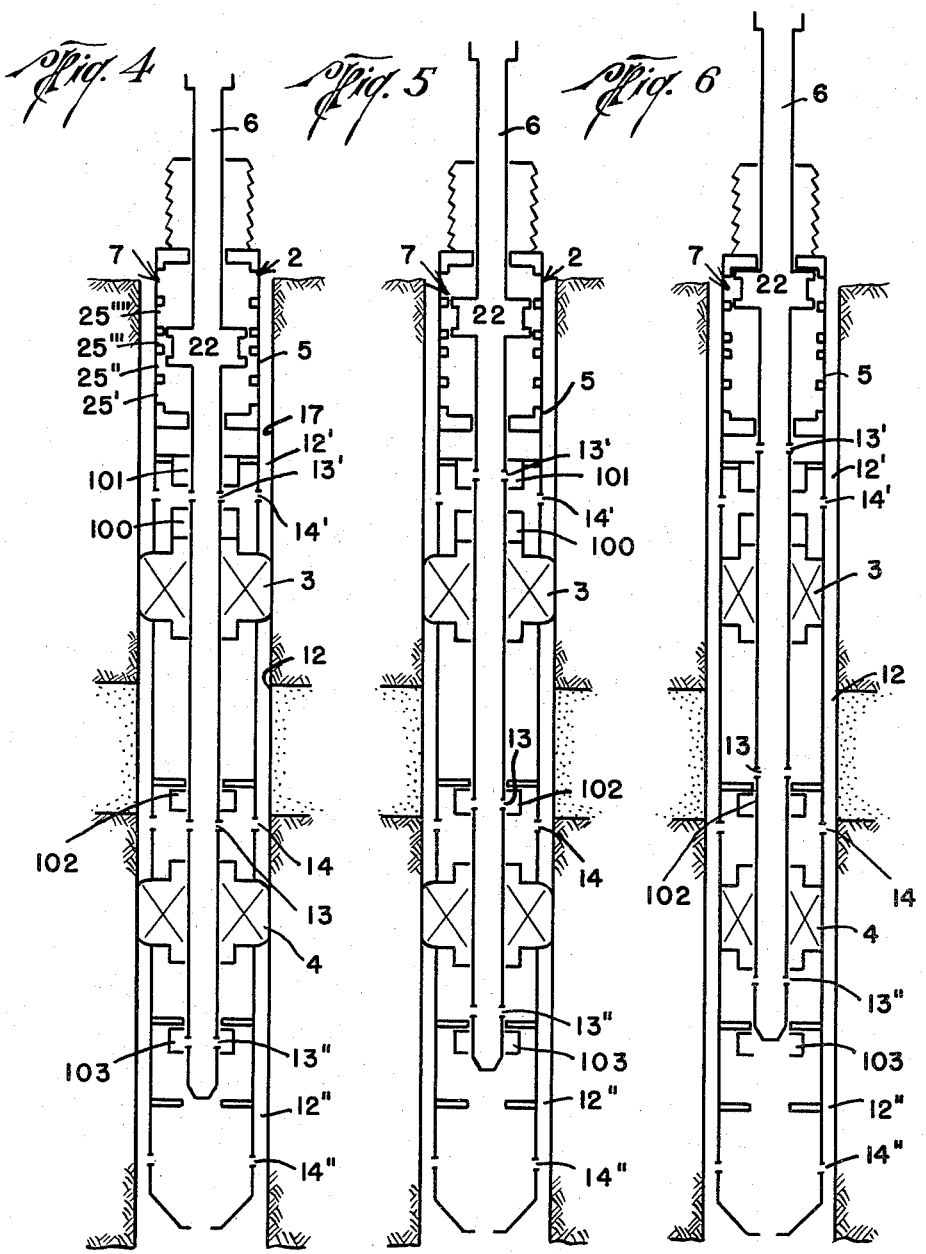

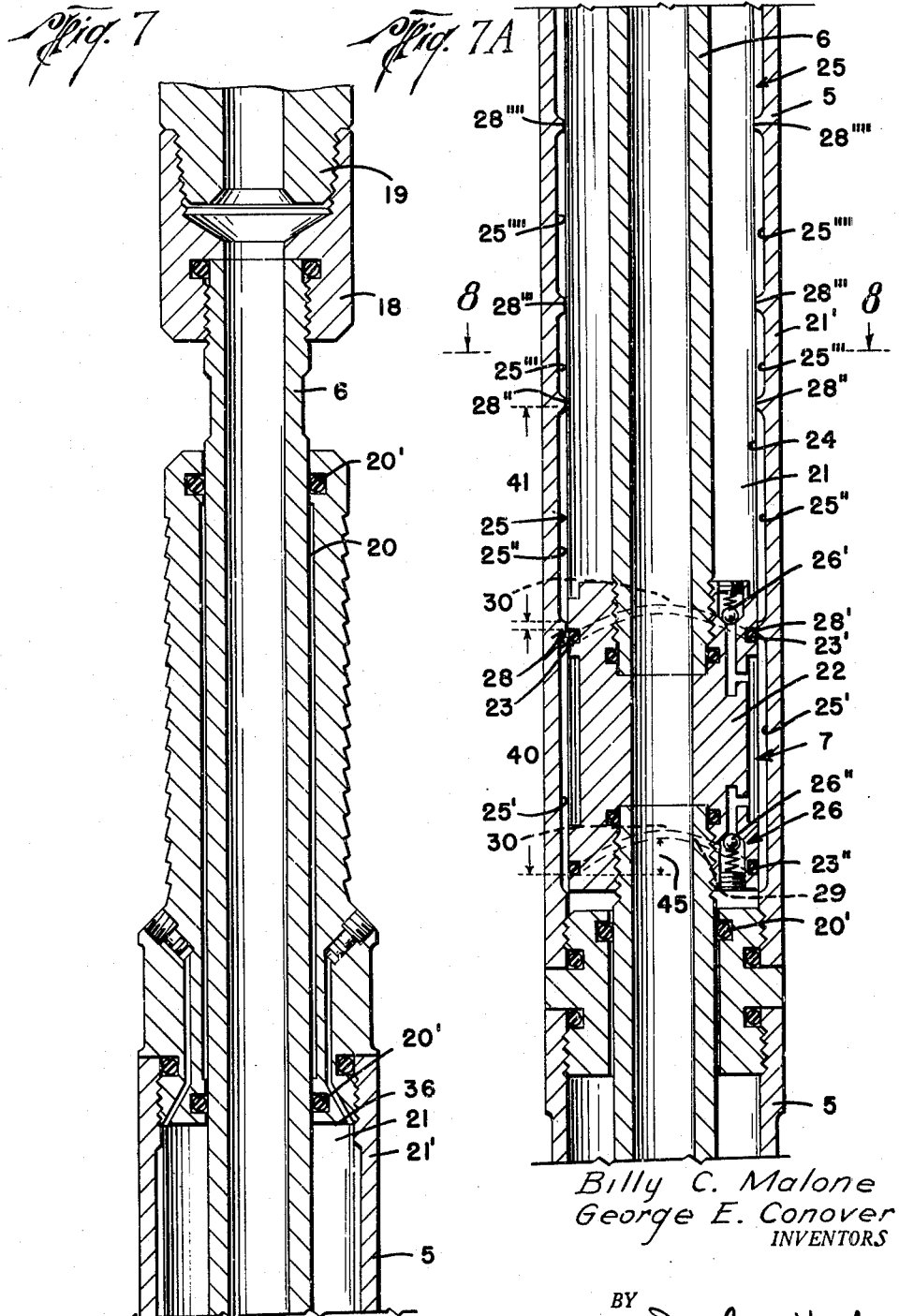

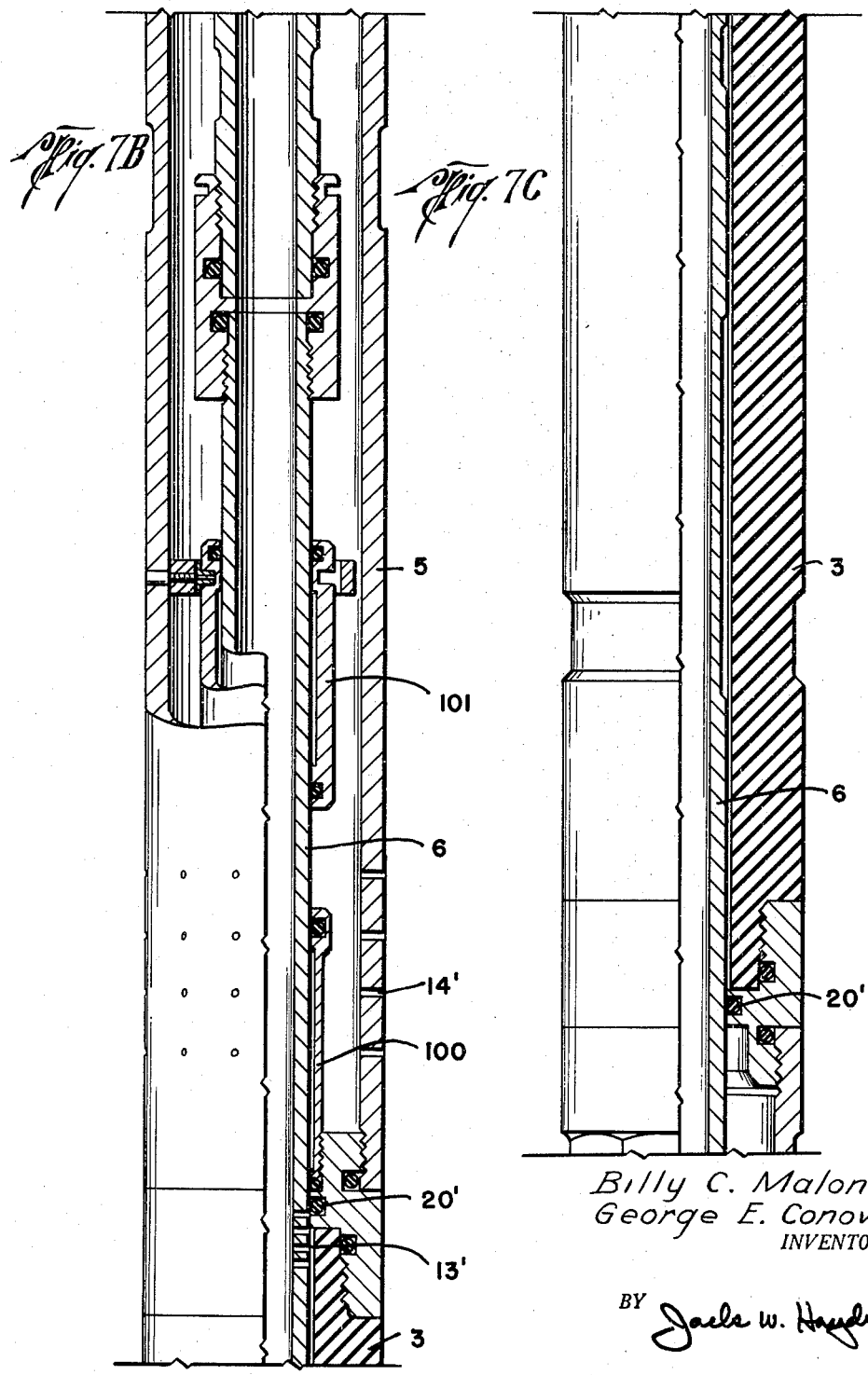

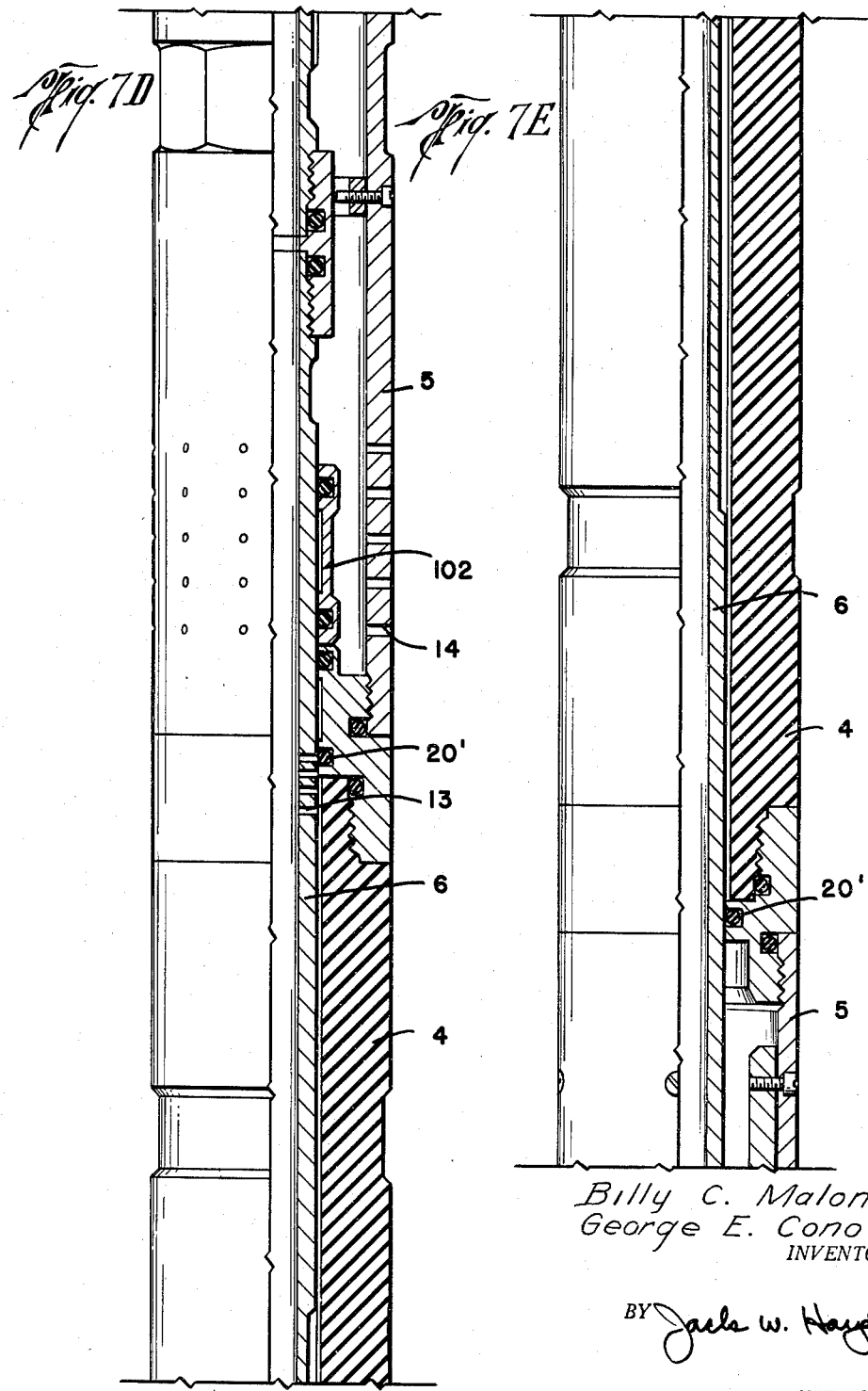

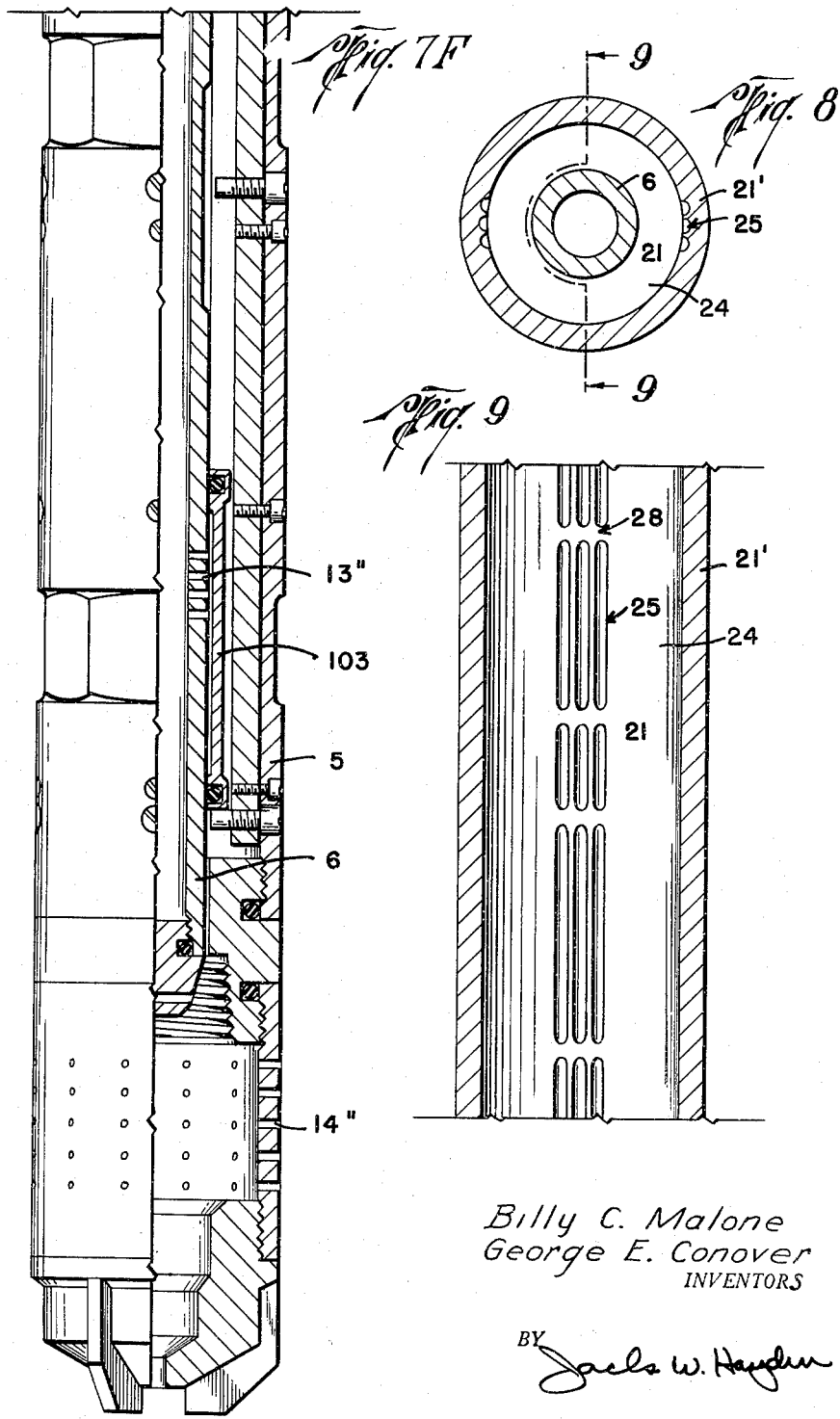

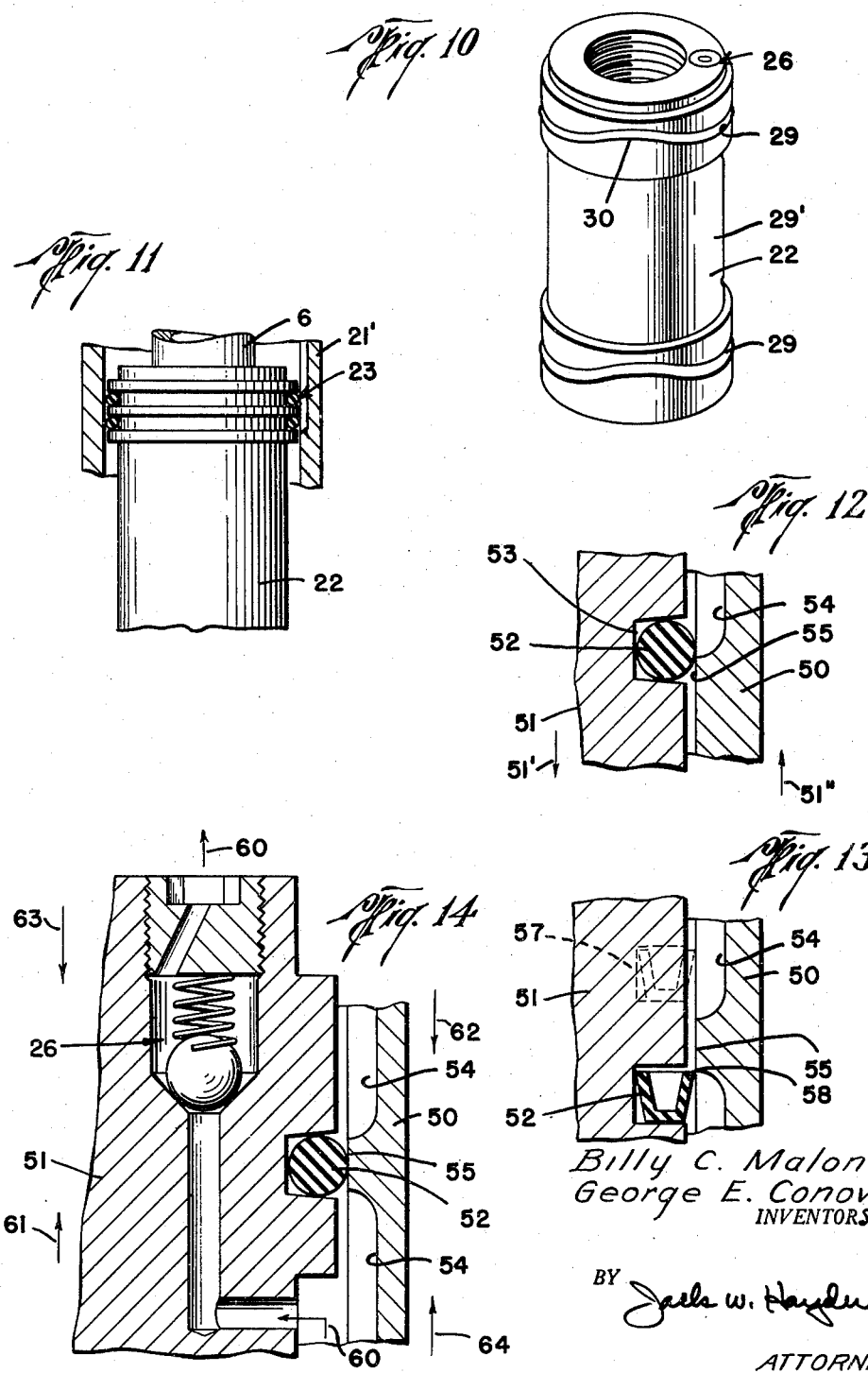

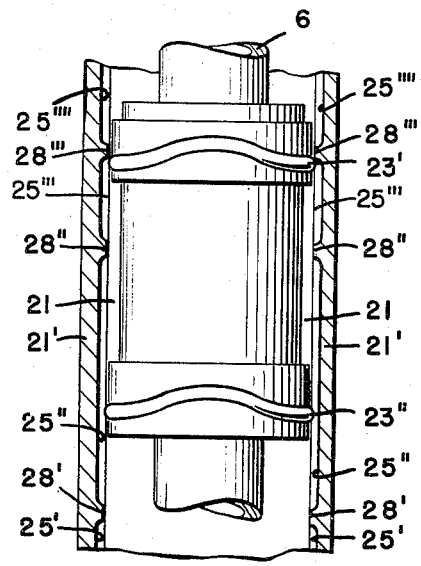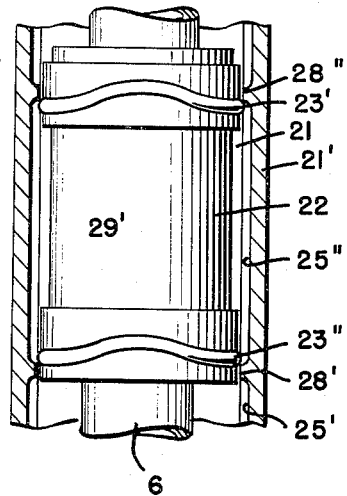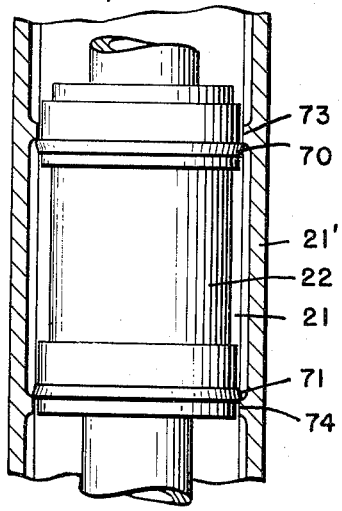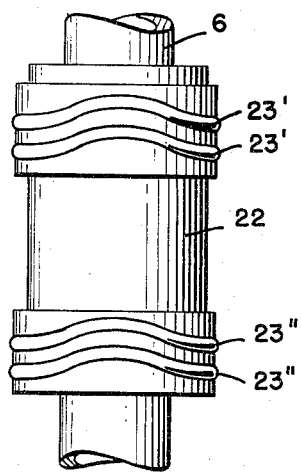

2,951,539

FLUID POSITIONING MECHANISM

Billy C. Malone and George C. Conover, both of Rte. 1, Box 47F, Midland, Tex.

Filed June 3, 1954, Ser. No. 434,289

21 Claims. (Cl. 166—237)

The present invention relates to apparatus for positioning members relatively, and more particularly to apparatus which may be used for limiting or stopping relative movement between members, which may be used for positioning members relative to each other and which may also be adapted for positioning members in any of various relative positions.

In manipulating well tools the point of manipulation of the tool on the earth's surface is located many thousands of feet from where the tool is in use in a well bore. The present invention relates to apparatus which adapts itself quite readily for use with a well tool where it may be desirable to position at least two members of the tool in a plurality of positions relative to each other and which positioning must be accomplished at a point removed from the well tool.

It is to be understood, of course, that not only does the present invention lend itself to application in this field, but it may be as readily applied to any situation where it is desired to control or regulate the relative position of two or more members.

There are minor disadvantages with mechanical apparatus which is used at the present time to position members of a well tool relative to each other. For example, where the manipulation of the mechanical apparatus is dependent upon applying a force either by setting weight, or pulling on the tool in order to effect operation of its mechanical positioning mechanism, it is quite often difficult to ascertain or to control the amount of weight that is set or that is pulled on the tool in the well bore and it is, therefore, difficult to always apply or pull the proper amount of weight on the tool. Too much weight pulled or set on the tool may bind a mechanical positioning or locking mechanism which in effect prevents actuation of the device in a desired manner.

If too much weight is applied to or pulled on a mechanical positioning apparatus in an endeavor to effect actuation thereof, the relative movement between the operating parts of the mechanism may occur so rapidly as to cause such mechanism to pass through or skip one or more operating positions in the tool. In other words, there is no assurance in a mechanical positioning or locking mechanism that the parts of the tool are in their next or desired relative position and there is, therefore, no positive catching or latching between the relative movable member of the tool. Furthermore, a mechanical positioning or locking mechanism for a well tool is generally expensive to make and maintain in proper operating condition and it is intricate in construction and function.

A mechanical locking or positioning device contains certain cooperating and movable parts which in themselves take up a certain amount of space, thereby limiting the proximity of individual positioning elements and also limiting the arrangement of the positioning devices. The present invention overcomes these and other disadvantages by providing a mechanism that contains a minimum number of moving parts and whose elements may be arranged in any desired operating order.

An object of the present invention is to provide a fluid device for limiting movement between members.

Another object of the present invention is to provide a hydraulic device for limiting movement between members.

Still another object of the invention is to provide a hydraulic locking or positioning device whereby a plurality of members may be locked or positioned in any of a plurality of predetermined longitudinal positions.

Still another object of the invention is to provide a fluid locking or positioning device whereby a plurality of members may be locked or positioned in any of a plurality of predetermined longitudinal positions.

A still further object of the invention is to provide an apparatus for controlling the movement of a piston element in a fluid reservoir including seal means to form a fluid seal between the piston element and reservoir and additional means for breaking the fluid seal whereby the piston element may move relative to the fluid reservoir.

A still further object of the invention is to provide an apparatus for controlling the movement of a piston element in a hydraulic reservoir including seal means to form a hydraulic seal between the piston element and reservoir and additional means for breaking the hydraulic seal whereby the piston element may move relative to the hydraulic reservoir.

Still another object of the invention is to provide an apparatus for locking a piston element in a fluid reservoir by forming a fluid seal between the piston element and reservoir whereby no relative movement of the element within the reservoir may occur.

A further object of the invention is to provide an apparatus whereby one member may be moved to and locked in a position relative to another member.

Still a further object of the invention is to provide an apparatus whereby one member may be moved to and locked in a position relative to another member and thereafter unlocked from such position.

Still a further object of the invention is to provide an apparatus whereby one member may be moved to and locked in a position relative to another member and thereafter released from such position.

Still another object of the invention is to provide an apparatus wherein one member may be moved relative to another member, there being a liquid reservoir and a piston element therein associated with said one and other members respectively and cooperating means on the piston and liquid reservoir for controlling the displacement of liquid therein which in turn controls the movement of the piston and its connected member relative to the other member.

A still further object of the invention is to provide a locking mechanism for a well tool wherein one member of the tool may be moved relative to another member by applying a thrust or pull to one member and rotating it whereupon it moves either in the direction of thrust or pull as desired.

Still another object of the invention is to provide a positioning device for paired members wherein one member may be positioned longitudinally relative to the other member, the positioning device being actuated by rotating and applying a force to either of the members.

A still further object of the invention is to provide a hydraulic lock between members wherein seal means is provided between the members so as to create a hydraulic lock therebetween.

Still another object of the invention is to provide a positioning device for members wherein it is desired to position the members relatively, the positioning device being actuated by rotating and applying a force to any of the members.

A still further object of the invention is to provide a locking and unlocking mechanism for positioning members in a plurality of desired relative longitudinal positions wherein a hydraulic connection is provided between said members, said connection including a reservoir, a piston element therein, fluid seal means for locking the piston element relative to the liquid reservoir and additional means for breaking the fluid seal whereby the piston element may move in the reservoir to effect relative movement between said members.

Other objects and advantages will become more readily apparent from a consideration of the following description and drawings, wherein:

Fig. 1 is a schematic diagram illustrating an inflatable packer well tool being lowered into a well bore, the well tool incorporating the positioning apparatus of the present invention thereon;

Fig. 2 is a schematic illustration showing the packer tool of Fig. 1 with the inflatable packer elements thereof inflated which anchors the packer elements against the wall of the well bore and positions the tool in the well bore;

Fig. 3 is a schematic illustration of the relative movement between the operating pipe or mandrel and the well tool which may be accomplished by the positioning apparatus herein described.;

Figs. 4, 5 and 6 are schematic illustrations of a well packer tool showing relative positions between parts of the tool as accomplished by a device incorporating the present invention;

Fig. 7 is a vertical sectional view of the upper portion of the well tool which is schematically illustrated in Figs. 1–6 and shows the pipe or operating mandrel extending downwardly into the well tool body from its connection with the tubing that extends to the earth's surface;

Fig. 7A is a continuation of Fig. 7 and shows an arrangement of a fluid reservoir associated with the well tool body and a piston element connected to the mandrel and position in the reservoir whereby the mandrel and well tool body may be located relatively in a plurality of positions.

Fig. 7B is a continuation of Fig. 7A showing the mandrel extending downwardly through the well tool body and ports therein for communication with the inflatable elements and for communication with the ports in the well body;

Fig. 7C is a continuation of Fig. 7B illustrating the inflatable element on the well tool body with the operating pipe or mandrel extending downwardly therethrough;

Fig. 7D is a continuation of Fig. 7C showing the continuation of the mandrel and well tool body;

Fig. 7E is a continuation of Fig. 7D showing an additional inflatable element on the well tool body with the operating pipe or mandrel extending therethrough;

Fig. 7F is a continuation of Fig. 7E showing the lowermost portion of the well tool body and operating pipe or mandrel terminating therein;

Fig. 8 is a horizontal sectional view on the line 8—8 of Fig. 7A and shows an arrangement of fluid passage means in the reservoir for accommodating passage of fluid relative to the piston element;

Fig. 9 is a vertical sectional view on the line 9—9 of Fig. 8 also illustrating an arrangement of the fluid passage means in more detail;

Fig. 10 is a perspective view illustrating in detail the piston element of Fig. 7A;

Fig. 10A is an elevation of a modification of the piston element seal means;

Fig. 11 is an alternate modification of a piston element;

Fig. 12 is a partial sectional view of a piston element and a fluid reservoir and illustrating a form of seal means disposed on the element for limiting travel between the piston element and reservoir;

Fig. 13 is a partial sectional view of a piston element and a reservoir with another form of seal means disposed to form a fluid seal between the piston and cylinder wall;

Fig. 14 illustrates a modification of fluid by-pass means and seal means for the piston and reservoir;

Figure 15:
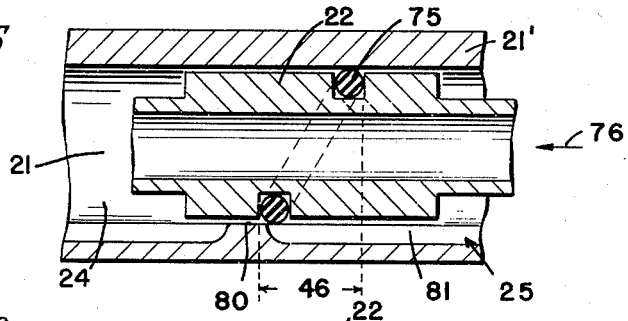
Fig. 15 illustrates a piston element in a reservoir at the time of initial fluid seal between the piston element and reservoir wall.

Fig. 20 is a sectional view partly in elevation illustrating the relative position of the piston element in the reservoir of Fig. 7A when the piston element has been moved to a position in the reservoir in which it is locked against movement in either direction in the reservoir and which may be unlocked and moved in either direction by rotating and applying a force to either the piston element or the reservoir housing;

Fig. 21 illustrates another position of the piston element in the reservoir where the element is locked against further upward movement in the reservoir whereby the element must be unlocked before further upward movement can occur but is not locked against downward movement in the reservoir; and Fig. 22 illustrates a piston element in a reservoir with an alternate form of seal means thereon whereby the piston element and reservoir may be locked in a predetermined position.

The invention is illustrated as being used with a well tool wherein it is desired to manipulate a control pipe or operating mandrel to a plurality of longitudinal positions relative to the body of the tool in order to accomplish desired testing or treating functions in the well bore. However, it should be understood that the apparatus may be used wherever it is desired to position members relative to each other.

In Fig. 1, the well tool is illustrated generally at 2 and is shown as comprising a pair of spaced inflatable packer elements 3 and 4 carried by the tool body 5 which body is supported on the operating pipe or mandrel 6. As the tool is lowered into the well bore on the pipe, sections of tubing are added thereto at the top of the well until the well tool is positioned at the desired location in the well bore. In Fig. 1, the inflatable packer elements 3 and 4 are shown deflated so that they will not interfere with the passage of the tool as it is lowered in the well bore to the desired location.

The positioning assembly is illustrated generally at 7 and provides a means whereby one member which in the present illustration is the operating pipe or mandrel 6 may be longitudinally positioned relative to another member which in the present example is the tool 2. By such positioning means the mandrel 6 may be manipulated so that the packer elements may be first inflated to expand and anchor against the well bore as illustrated at 9 and 10 in Fig. 2 whereby the tool body is positioned in the well bore. After the packer has been expanded to inflated position as illustrated in Fig. 2, the mandrel may then be moved longitudinally relative to the well tool body 2 to any of a plurality of positions whereby various ports in the mandrel 6 may be placed in communication with ports in the tool body 5 so as to provide a means whereby the mandrel or operating pipe 6 is communicated with a desired portion of the well bore formations.

In Fig. 3, the positioning device 7 has been operated so that the mandrel 6 is moved and positioned relative to the tool body 2 so that the mandrel ports 13 are in communication with the body ports 14 whereby the formation 12 of the well bore between packers 3 and 4 is in communication with the operating pipe or mandrel 6.

Fig. 4 illustrates still another position of the mandrel with respect to the tool body 5 whereby the mandrel is in communication with the formation 12 between the spaced packers 3 and 4 and in communication with the well bore 12' above the top packer 3, since mandrel ports 13, 13' are in communication with body ports 14, 14' respectively. This position opens the mandrel or operating pipe 6 to the well bore area 17 above the packer element 3, as well as to the formation between the spaced packers 3 and 4.

Fig. 5 illustrates still another position of the operating pipe or mandrel 6 relative to the tool body 5 wherein the mandrel is in communication with the well bore 12" below lower packer element 4 since ports 13" at the lower end of the mandrel are in communication with the body ports 14" at the lower end thereof, with the other mandrel and body ports not in communication.

Fig. 6 illustrates still another position of the operating pipe or mandrel 6 in the body 5 of the well tool 2 wherein all of the ports in the mandrel are in communication with the body ports above, below and between the packer elements 3 and 4.

It seems obvious that any desired combination of positions or arrangement of positions of the mandrel 6 relative to the packer tool body 5 could be provided depending upon the use for which a tool may be adapted. As previously mentioned, while the positioning device 7 is illustrated and described herein particularly as being applied to a well packer tool, it seems obvious that such positioning mechanism could be as readily applied in any well tool or in any other situation where it is desired to either limit or stop the movement between members or where it is desired to limit or stop and lock between members, as well as any situation where it may be desirable to stop relative movement between members, lock the members together and then unlock, whereby relative movement may occur between the members.

The well tool illustrated in Figs. 1–6 is illustrated in detail in Figs. 7–7F and attention is directed to Figs. 7 and 7A wherein the operating pipe or mandrel 6 is shown as connected at its upper end to a coupling 18 to which in turn the tubing 19 is connected which suspends the tool from the earth's surface in the well bore.

After the packers 3 and 4 have been inflated by passing a fluid down mandrel 6 and into the packers, to anchor the tool in the well, the tubing or operating pipe is manipulated at the earth's surface to operate the tool for its intended function. The operating pipe or mandrel 6 is illustrated as extending through the body 5 of the tool to which are secured inflatable packers 3 and 4 and suitable seal means 20' are arranged in the well tool so as to form a fluid seal about the periphery 20 of the mandrel to seal off or isolate the inflated packers relative to the mandrel to seal off communication between the mandrel and body except when communication is established by means of the mandrel and body ports as previously described.

The positioning mechanism 7 is illustrated in more detail in Figs. 7 and 7A and is shown as including a fluid or liquid reservoir 21 with a barrier or piston element 22 therein. The fluid reservoir 21 is formed by the housing extension 21' which may be a part of the body 5 of the tool as shown in the drawings. The mandrel 6 extends through the housing 21' and reservoir 21 and the piston element or barrier 22 is connected with the operating pipe or mandrel 6 by any suitable means and is positioned within the reservoir as shown in Fig. 7A. Positioning of the mandrel 6 relative to the well tool body 5 is accomplished by relative positioning of the barrier or piston 22 and the fluid reservoir housing 21'.

The reservoir 21 is adapted to contain a non-compressible fluid medium and the reservoir may be filled when the tool is assembled. Suitable seal means 20' are arranged between the housing 21' of the tool body 5 and mandrel 6 to inhibit loss of such medium from the chamber or reservoir 21 as relative movement occurs between such chamber and the barrier or piston element 22 and connected mandrel 6.

Seal means are provided as illustrated generally at 23 on the barrier 22 whereby a fluid seal may be formed between such barrier and the inner wall surface 24 of the chamber or reservoir 21 to prevent displacement of fluid in the chamber or reservoir whereby no relative movement can occur between the barrier or piston element 22 and reservoir 21. When the piston or barrier 22 is in fluid seal relationship with the reservoir wall, no relative movement can occur between the members to which the piston and reservoir are connected which in the illustration presently given is the mandrel 6 and well tool body 5 respectively.

In Fig. 7A of the drawings spaced seal means 23', 23" are shown adjacent each end of the piston element and extending about the piston element. This arrangement permits a fluid seal to be formed between the piston element and reservoir whereby no relative movement in either direction can occur between the piston and reservoir as will be discussed more fully hereinafter.

However, since it is necessary in the operation of the tool that relative movement or positioning occur between the mandrel 6 as one member and the tool body 5 as the other, suitable means are provided for breaking the fluid seal existing between the piston element and reservoir whereby fluid in the reservoir may be displaced or leak around seal means 23', or 23", depending upon where the fluid seal exists whereby the barrier 22 and reservoir 21 may be moved relative to each other in a desired manner.

One form of suitable means for nullifying the effect of the seal means 23', 23", on piston 22 is illustrated in Figs. 8 and 9 of the drawings and is shown as comprising grooves denoted generally at 25 which extend longitudinally of the reservoir wall 24. A space generally denoted at 28 is provided between the ends of the grooves which space is an unslotted or ungrooved portion of the cylinder wall 24. The grooves are shown as being diametrically arranged on the sides of the chamber or reservoir 21 as illustrated in Fig. 8 of the drawings, and as shown in Fig. 9, the length of the grooves may vary, and the variation in the length of the grooves aids in determining the amount of travel or relative movement which may occur between the barrier 22 and the chamber or reservoir 21. Similarly, the location of the ungrooved areas 28 determines when relative movement between the piston 6 and reservoir 21 stops, since contact of either of the seal means 23' or 23" with any ungrooved area creates a fluid seal between the piston and reservoir, the effect of which fluid seal must be eliminated before additional movement between the mandrel 6 and tool body 5 can occur.

While three grooves are illustrated in the drawings, as being in the sides of the cylinder wall, this number may be varied without departing from the scope of the invention. Also the length of the grooves 25 and the arrangement of the ungrooved areas 28 at the ends thereof are shown in the drawings so as to illustrate the operation and actuation of the mechanism 7 in positioning the mandrel 6 in predetermined longitudinal positions relative to the tool body 5 so as to carry out the function and intended purpose of the tool. Therefore, in other situations the length of the sets of grooves may be altered to suit any desired situation or condition.

Additional means for passing or displacing the fluid as the barrier 22 and the reservoir 21 move relative to each other may be provided in the form of spring loaded one-way operating check valves generally denoted by the numeral 26 which also serve to aid in passing the fluid around the seal means 23 as the barrier and chamber are moved relative to each other. Spaced check valves 26' and 26" are shown in piston element 22 in Fig. 7A of the drawings whereby fluid may be passed around seal means 23' and 23" to be more fully described hereinafter. The functional relationship between the grooves 25 and check valves 26 will be discussed more fully hereinafter.

When the barrier 22 is in its lowermost position in the reservoir 21 as shown in Figs. 1, 2 and 7A of the drawings, some part of the seal means 23' adjacent the top of the piston contacts the first ungrooved area 28' which is between the first set of longitudinally extending grooves 25' and the second set of longitudinally extending grooves 25". The contact of the seal ring 23" with area 28' creates a fluid lock whereby no relative movement of the barrier 22 in reservoir 21 can occur and similarly, no relative movement between the respective associated elements, namely, the operating pipe 6 and well tool 5 can occur.

It will be noticed that the seal means 23 is illustrated in Fig. 7A as extending about the piston element 22 in a desired manner. This arrangement is illustrated more clearly in Figs. 10 and 10A wherein the continuous groove 29 on the periphery 29' of the piston is shown as being irregular relative to the longitudinal axis of the piston 22 and as having two high points 30 which are spaced 180° apart.

By arranging the seal means on the piston in an irregular manner such as illustrated by way of example in Figs. 10 and 10A of the drawings, it is possible to slide the seal means 23' across the ungrooved area 28', thereby placing the seal means 23' so that fluid may communicate therearound by means of grooves 25". Since seal means 23" on piston 22 is initially over grooves 25', fluid may pass therearound and relative movement between the mandrel 6 and housing 5 may occur to move the mandrel from the position illustrated in Fig. 7A and in Figs. 1 and 2 to that illustrated in Fig. 3 of the drawings.

In order to better understand the principle of operation of the positioning mechanism 7 which allows members to be locked in a position and then released from such position by rotating either of them and exerting a pull or push thereon, attention is directed to Figs. 15–19 inclusive.

Figs. 15–19 illustrate the principle of the present invention which permits relative movement between members to be limited, and which permits members to be moved to a predetermined relationship, locked in such relationship and thereafter released or unlocked from such relationship. In Fig. 15 the reservoir housing is indicated at 21', the reservoir as 21 and the piston as 22. Seal means 75 is provided on the element, such seal means being tilted and in a plane at an angle with respect to the longitudinal axis of the piston as shown in the drawings. Also, the reservoir 21 is provided with longitudinally extending grooves 25 along only one side thereof. While the arrangement of the seal ring 75 on piston 22 differs slightly from the arrangement of seal ring 23' on piston 22 in Fig. 7A, and while Fig. 15 illustrates grooves 25 extending along only one side of the reservoir walls 24, the principle in both instances is the same.

For example, if piston 22 and housing 21' are initially in the relative position shown in Fig. 15, and if it is desired to move piston 22 and connect mandrel 6 in the direction indicated by arrow 76, a force may be exerted on mandrel 6 to move it in the direction of arrow 76, until seal ring 75 contacts ungrooved surface area 80. Since the member 6 and piston 22 connected therewith have been moved in the direction indicated by the arrow 76, displacement of fluid will occur in reservoir 21 around seal ring 75 so long as seal ring 75 is over the groove 81. After the seal ring 75 has contacted ungrooved area 80 no further movement of piston 22 in the direction of the arrow 76 can occur because a fluid seal is formed by the seal means, fluid and ungrooved area 80.

Figure 16:
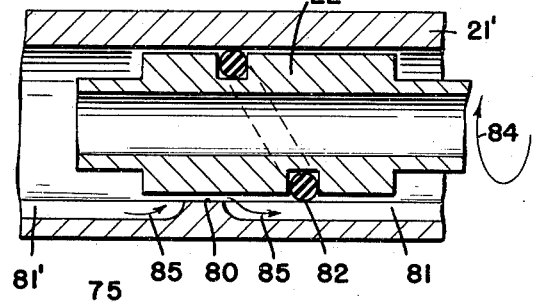
Figs. 16, 17, 18 and 19 illustrate the stepwise rotational movement between the piston element and reservoir of Fig. 15 to break the fluid seal whereby longitudinal movement between the piston element and reservoir may occur.
Figure 17:
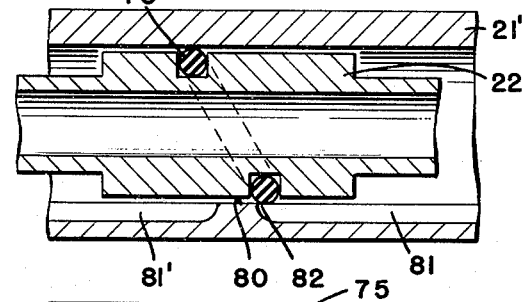
Figure 18:
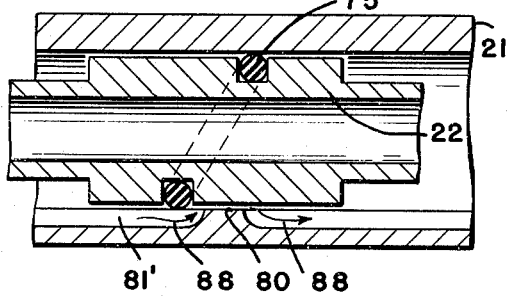

In order to unlock or release the member 6 from such position it is necessary to break the fluid seal and this can be done by positioning the seal ring 75 so that fluid in the reservoir 21 may be passed around seal ring 75 and across ungrooved surface area 80 from groove 81'. Since the seal ring 75 is arranged on piston 22 at an angle with respect to the longitudinal axis thereof, the piston 22 and connected mandrel 6 may be rotated in the direction indicated in Fig. 16 by arrow 84 which will have the effect of moving the seal ring 75 back away from the area 80 as illustrated in Fig. 16 at 82. Fluid in reservoir 21 may now pass between the piston 22 and walls 24 of reservoir 21 as indicated by arrows 85.

Figure 19:
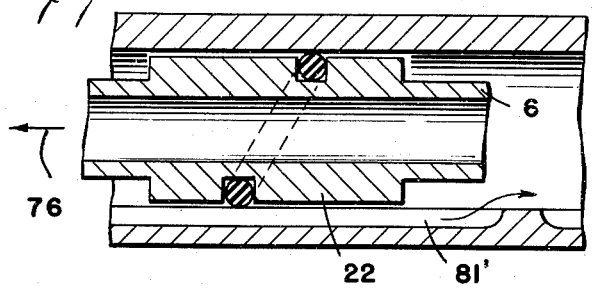

In other words, rotation of the mandrel 6, has in effect broken the seal which previously existed when the seal ring 75 initially contacted the ungrooved area 80 as shown in Fig. 15. Relative longitudinal movement between piston 22 and reservoir housing 21' as indicated by arrow 76 in Fig. 17 may occur until portion 82 of seal ring 75 contacts the ungrooved surface 80 which prevents further relative movement between the piston element 22 and fluid reservoir housing 21'. Upon additional rotation of the mandrel as illustrated by the arrow 86 in Fig. 18, the seal ring 75 slides across ungrooved area 80 without displacement of fluid around piston 22 until the seal ring reaches slot 81', then fluid can move around the piston. Relative longitudinal movement may then be effected between piston 22 and housing 21', since the position of the seal ring in Fig. 18 relative to surface 80 allows fluid to by-pass around the seal means as illustrated by the arrows 88 whereupon further relative movement between mandrel 6 and housing 21' may be effected as desired, as illustrated in Fig. 19. The seal has thus been broken and the mandrel 6 released or unlocked relative to the reservoir housing 21'.

While the principle of operation has been described in a situation where the piston 22 has been rotated and pulled relative to reservoir housing 21', the same result may be accomplished by rotating either member and by applying a push or pull to either member, since the object is to move and rotate the piston and housing relatively to each other to perform the functions above described.

Since the invention is illustrated as applied to a well tool wherein the reservoir 21 is secured to a body 5 that is anchored in the well bore, the invention is discussed and described herein so that the turning and application of force is applied to the operating pipe 6 and associated piston element or barrier 22. However, it should be appreciated that under different circumstances the rotation and application of force could be as readily applied to the housing accommodating the reservoir or to both the housing and piston to accomplish the same end results.

From the foregoing descriptions and as previously pointed out the barrier 22 as shown in Fig. 7A is locked against moving upwardly in the reservoir since the upper seal ring 23' is in fluid seal contact with the unslotted or ungrooved portion 28' on the inner wall 24 of the reservoir and, therefore, cannot move upwardly since the fluid in the reservoir cannot be displaced as longitudinal movement of the piston 22 and connected mandrel 6 is attempted. When the mandrel 6 is rotated and pulled the O-ring 23' on piston 22 crosses the unslotted portion 28' in a manner as previously illustrated and described with regard to Figs. 15–19 and thereby breaks the seal existing between the piston 22 and the reservoir wall at 28'. This allows fluid to leak or pass by the piston 22 as it is moved upwardly in the reservoir 21. Since the lower seal ring 23" is over the grooved area 25' in the reservoir wall 24 at the beginning of the movement, by-passing of fluid therearound can occur. As the piston moves upwardly fluid is displaced by passing through the grooves 25" and 25' and around to the lower end of the reservoir and lower end of the piston.

When any portion of the top seal ring 23' contacts the next ungrooved area 28" at the upper end of grooves 25" upward movement of the piston 22 will stop since a fluid seal is created and fluid can no longer be displaced around the seal means 23'. This position of the piston 22 and mandrel 6 relative to the housing 21' and well tool body 5 is schematically illustrated in Fig. 3 and the relationship between the piston element 22 and reservoir 21 is illustrated in more detail in Fig. 20.

The distance between any part of the top seal ring 23' and the same relative part of the lower seal ring 23" is the same since they are arranged in phase on the piston 22 as illustrated in Figs. 10 and 10A. The distance 40 between the upper and lower seal ring grooves 29 is approximately the same as, or slightly less than, the distance 41 between ungrooved areas 28' and 28" as illustrated in Fig. 7A, so that when the top seal ring 23' contacts the unslotted area 28" the lower seal ring will have been moved across the unslotted area 28'.

As illustrated in Fig. 7A, the distance 45 between the high part of the groove 29 and the low point of the groove must be at least equal or slightly greater than the distance across any unslotted area so that the seal ring will slide completely across the unslotted area when the member on which it is mounted is rotated to insure unlocking of the piston 22 or so as to insure breaking the fluid seal. Similarly, in an arrangement such as illustrated in Fig. 15, the distance 46 must be at least equal to the distance across any unslotted area so as to provide an operative mechanism.

In order for the lower seal ring 23" to move across the unslotted area 28', fluid must be able to pass around the seal created when ring 23" contacts area 28' and the one-way operating check valve 26" will open when seal ring 23" contacts and moves across area 28' so that fluid may be displaced around the lower seal ring 23" whereby the piston may move to the position illustrated in Fig. 3 and in Fig. 20. In such position the piston 22 and mandrel 6 are locked against moving in either direction in the well tool body 5 and housing 21' since upper seal ring 23' contacts area 28" to form a fluid seal and prevent further upward movement and lower seal ring 23" having moved across area 28', contacts the area 28' and prevents downward movement. No fluid can pass through check valve 26' when upward movement of the mandrel is attempted, and no fluid can pass through check valve 26" when downward movement is attempted.

When the mandrel 6 and the connected piston element 22 are moved so that the seal rings 23', 23" contact the ungrooved areas 28", 28' respectively, the tool will be in the position illustrated in Fig. 3 of the drawings wherein the mandrel has been raised so that the ports 13 therein intermediate the inflated spaced packers 3 and 4 are in communication with the body ports 14 whereby suitable treating or testing operations between the packers may be carried out.

In order to move the mandrel 6 upwardly to the next position in the tool body 5 it is necessary to break the seal existing between the top seal ring 23' and the ungrooved area 28". This unlocks the mandrel 6 and allows it to be moved upwardly in the well tool body. This can be accomplished by exerting a pull on the mandrel while simultaneously rotating it whereupon the seal ring 23' moves across the face of the unslotted area 28" and then allows fluid to leak around the seal ring from grooves 25''' thereabove. Since seal ring 23" is over grooves 25", it does not interfere with upward movement of the piston from the position of Fig. 3 and Fig. 10.

The mandrel 6 and piston element 22 connected thereto may then move upwardly until the seal ring 23' contacts the next unslotted area 28''' at the end of grooves 25'''. In this position the mandrel 6 is locked against further upward movement relative to the well tool body 5, but it is not locked against downward movement since the lower seal ring 23" is over grooves 25" and no fluid seal is created at the lower end of the piston. This position is illustrated in Fig. 4 and in Fig. 21 of the drawings and is an intermediate position which may be used in certain given conditions. In such position in the present invention, the mandrel communicates with the formation 12 between the packers and communicates with the well bore 12' above the packer 3 through ports 13, 13' in the mandrel and body ports 14, 14' respectively.

In order to move the mandrel 6 upward to the next position relative to the tool body 5, the mandrel is rotated whereupon the top seal ring 23' again moves across an unslotted area which is in this case area 28''', whereupon communication above and below the top seal ring 23' is effected since seal ring 23' is over grooves 25'''' so that fluid may be displaced as the piston element 22 and connected mandrel 6 moves upwardly. The piston 22 and mandrel 6 may be moved upwardly until the seal ring 23' contacts ungrooved areas 28'''' at the end of grooves 25''''. Seal ring 23" in the meantime has been moved across unslotted areas 28" and respectively. This position of the mandrel is similar to that illustrated in Fig. 20 since the bottom seal ring 23" has been moved across an unslotted area, and is in position to create a fluid seal and prevent downward movement of the piston 22 and mandrel 6 while top seal ring 23' is in position to create a fluid seal and prevent upward movement of the piston 22 and mandrel 6.

The one-way check valve 26" has accommodated displacement of fluid as the seal ring 23" has moved across the unslotted surface 28''' and since the upper seal ring 23' contacts the unslotted surface 28'''' immediately thereabove and since the lower seal ring contacts the unslotted surface immediately therebelow relative movement between the mandrel and the tool body either in an upward or downward direction is prevented. This position is schematically illustrated in Fig. 5 of the drawings and is illustrated in more detail in Fig. 20. In such position the mandrel has been opened only to the well bore 12" below lower packer 4 through mandrel ports 13" and body ports 14", while the other mandrel ports and body ports have been sealed off relative to each other.

In the next position of the tool, the piston element 22 and mandrel 6 have been rotated and pulled upwardly over the last set of grooves so that the end of the piston 22 abuts at 36 against the well tool while the lower seal ring has moved across unslotted area 28'''' and locks the mandrel against downward movement by sealing with such unslotted surface. This position of the mandrel in the tool opens all ports 13, 13', 13" to body ports 14, 14' and 14" and releases the tool to come out of the hole.

If it is desired to move the mandrel from some position back to another position prior to unseating the tool in the well, such movement may be accomplished by pushing, or setting weight on the mandrel whereby it, upon rotation will cause lower seal means 23" to slide across the unslotted surface in a manner as described with regard to seal means 23'. Also check valve 26' allows seal means 23' to move across an unslotted area by bypassing fluid around such seal ring as the seal ring moves downwardly across the unslotted area.

The arrangement and spacing of the unslotted areas in the reservoir 21 with regard to seal means 23', 23" determines whether or not the piston element 22 is locked at any given position against either upward or downward movement or against movement in an upward direction only or against movement in a downward direction only. If only the upper seal ring 23' is positioned adjacent and below an unslotted area then relative movement of the mandrel 6 in the tool body 5 is prevented in only an upward direction. If the lower seal ring 23" is positioned adjacent and above an unslotted surface then downward movement of the mandrel with respect to the well tool body 5 is prevented and if both upper and lower seal rings are disposed so that when the piston is moved in either an upward or downward direction the seal rings contact an adjacent ungrooved area on the reservoir wall then the piston element is locked against movement in either an upward or downward direction. Since the location of the ungrooved areas determines whether or not the piston is merely positioned or limited in its movement in the reservoir or whether it is locked against movement in one direction or in both directions, it seems obvious that the grooves may be arranged as desired in any given situation or in any given well tool.

The positions previously described in connection with the present well tool are merely illustrative of suitable positions which may be used for a packer tool of the type described herein to accomplish a desired function of the tool.

In some situations it may be desirable to provide an arrangement wherein the relative movement between members may be only limited. A suitable construction for accomplishing such function is illustrated in Fig. 12 wherein a section of a reservoir housing is illustrated at 50 and a section of a barrier or piston element at 51. A seal ring 52 may be disposed in an annular groove 53 on the piston element 51 so that as long as the piston 51 is moved in the direction of arrow 51' and adjacent the longitudinally extending groove 54 in reservoir wall 50 relative movement may occur between the element 51 and the reservoir wall 50. However, when the seal ring contacts the unslotted area 55 further movement between the piston element and reservoir is prevented since no further fluid may be by-passed around the seal means. In the form illustrated in Fig. 12, the annular groove 53 may extend circumferentially about the piston element 51 in which case, the construction would merely serve as a limiting device for limiting the relative movement between members wherein one member could be connected to the piston element and another member connected to the reservoir. Also, the same result is accomplished if reservoid 50 is moved as indicated by arrow 51". In other words, the movement may be by either member, but such movement will stop when the seal ring 52 contacts unslotted area 55.

In the modification illustrated in Fig. 13, a lip seal ring is illustrated at 52 in place of an O-ring and allows relative movement between piston element 51 and reservoir 50 when the seal ring is over the longitudinally extending groove 54 as illustrated in dotted line at 57. Further movement between element 51 and 50 can occur until the lip ring has moved across unslotted portion 55; however, when reverse operation or reverse relative movement of the piston and reservoir is attempted a fluid seal is created at 58 between the lip seal ring and the ungrooved portion 55 of the reservoir 50 thereby preventing movement between member 51 and reservoir 50 in a direction opposite to that initially started. Also, if the direction of movement is such that the lip seal ring approaches the ungrooved area 55 from a direction opposite that above described, the device will also act as a limiter of movement between the piston element 51 and the reservoir or element 50.

In Fig. 14 a modification is illustrated wherein the annular seal ring 52 is provided with suitable means in the form of one-way check valve means 26 whereby the seal ring may be moved across the surface 55 in one direction only by permitting fluid to be by-passed around the seal ring 52 through the check valve means 26, the direction of fluid flow being in the direction indicated by arrows 60. However, after the seal ring has been moved across area 55, piston 51 cannot then be moved in the direction indicated by arrow 61, and similarly when an attempt is then made to move reservoir 50 in the direction indicated by arrow 62, no relative movement can occur between the piston 51 and the housing 50 when the O-ring is in contact with the unslotted portion 55. However, when either the piston element 51 or the reservoir 50 is moved in the direction indicated by arrows 63 or 64 respectively, relative movement may occur whether the seal ring is over a groove or whether it contacts the unslotted portion 55 since the fluid in the reservoir may be by-passed around the seal ring through check valve means 26 as previously discussed. The arrangement of Fig. 14 is functionally the equivalent of the construction of Fig. 13, in that the lip seal ring of Fig. 13 and the O-ring and check valve of Fig. 14 will move across the unslotted area in one direction but will not move back across the ungrooved area in the opposite direction.

In some instances it may be desirable to provide more than one seal means on the piston element 22 and one such arrangement is illustrated in Fig. 10A, wherein two seal rings are illustrated on opposite ends of the piston element 22. When two seal rings are used as illustrated in Fig. 10A, the apparatus requires more rotation to be released from a locked position than when only one seal ring is provided since both rings must move across an unslotted area before unlocking action can occur. Fig. 10A illustrates seal rings positioned on the piston similar to that described and shown in Fig. 10.

In Fig. 11, double rings are shown which extend circumferentially about the piston 22 in a plane perpendicular to the longitudinal axis of the piston. The construction of Fig. 11 may be used in situations where it is only desired to limit the movement between members as previously described, but not to lock and release from position.

Fig. 22 illustrates an arrangement whereby members may be moved relative a predetermined distance and then locked in such position. Spaced annular lip seal rings 70 and 71 allow either piston element 22 and reservoir housing 21' to be moved in either direction until both lip seal rings are disposed adjacent non-grooved surface areas 73 and 74, as shown in Fig. 22 whereupon further longitudinal movement in either direction of either member is prevented. This arrangement cannot be unlocked from position, but could be made to unlock if the lip seal rings were disposed similar to those shown in Fig. 20.

In the modifications illustrated in Figs. 1–10A inclusive, the seal ring groove 29 on the piston element 22 and groove means 25 is arranged so that the component of forces is balanced eliminating any tendency of the apparatus to gall or bind as relative movement occurs between members.

Also, it should be pointed out that while the positioning mechanism has been described wherein seal means are provided on a piston or barrier element and the fluid passage means is provided in the form of longitudinally extending grooves on the interior wall surface of the reservoir housing, the arrangement might under certain circumstances be altered as desired, with the grooves being arranged on the piston member and the seal means in the housing. The arrangement and type of seal means and fluid passage means is merely illustrative to accomplish the intended functional results of the apparatus. Any suitable arrangement of fluid passage means and seal means can be used to accomplish the object of the invention.

Sleeve means 100, 101, 102 and 103 are positioned on the mandrel 6 and are adapted to cooperate in providing a means of covering and uncovering the various mandrel ports as the mandrel is moved to various positions in the well tool body.

Broadly the invention relates to an apparatus for positioning members relatively to each other.

What is claimed is:

1. A device for positioning one member longitudinally relative to another member comprising a housing connected to one member, fluid in said housing, a piston in said housing and connected to the other member, there being longitudinal groove means in said housing for conducting fluid around said piston in said housing upon relative longitudinal movement between said piston and housing, seal means on said piston, and surface seal means on said housing at the end of said groove means engageable with said piston seal means to hold said piston and housing at a position longitudinally relative to each other, portions of said seal means on said piston being in a plane inclined at an angle relative to the longitudinal axis of said piston whereby relative rotation between said piston and housing disengages said piston seal means and housing seal means and opens said groove means for conducting fluid around said piston to permit relative longitudinal movement between said housing and piston.

2. A hydraulic locking mechanism for controlling the longitudinal relationship of a barrier in a hydraulic cylinder comprising a hydraulic cylinder, a movable barrier in said cylinder, and means for controlling the movement of fluid in said cylinder from one side to the other of said barrier whereby the barrier may be locked and released at a plurality of positions longitudinally spaced in said cylinder, said means comprising, spaced continuous annular seal means on said barrier and cylinder respectively at the longitudinally spaced positions which sealingly engage to form a hydraulic lock between said barrier and cylinder and hold them against movement in either direction longitudinally from the position, and hydraulic bypass means in said cylinder which breaks the hydraulic lock on relative rotation between said cylinder and barrier for bypassing liquid from one side to the other of said barrier upon relative longitudinal movement between said barrier and cylinder.

3. An arrangement for connecting and releasing two members together in a plurality of relative longitudinally spaced positions comprising fluid coupling means operatively associated with said members for connecting and releasing said members in a plurality of relative longitudinal positions, said coupling means including a reservoir element connected with one member and a movable element therein connected with the other of said members, said movable element movable by said other member to a plurality of longitudinal positions in said reservoir element, and cooperating means on said movable element and reservoir element for connecting and releasing said movable element and reservoir element in said plurality of positions, said cooperating means including spaced continuous annular seal means on said movable element and reservoir element respectively at the longitudinally spaced positions which sealingly engage to form a hydraulic lock between said movable element and reservoir element and hold them against movement in either direction longitudinally from the position, and hydraulic bypass means in said reservoir element which breaks the hydraulic lock on relative rotation between said reservoir and movable elements for bypassing liquid from one side to the other of said movable element upon relative longitudinal movement between said reservoir and movable elements.

4. A hydraulic positioning device for positioning a piston element longitudinally in a reservoir element against longitudinal movement in one direction relative to the reservoir element comprising a reservoir element for containing fluid, a piston element in said reservoir element, there being groove means in one of said elements, and one-way valve means in the other of said elements for passing fluid from one side to the other of said piston element upon relative movement between said reservoir and piston elements in one longitudinal direction, and seal means on said elements cooperating upon relative movement of said elements in the other longitudinal direction to seal off fluid movement from one side of said piston element to the other whereby the piston may be moved in one direction, and is locked against movement in the other direction to thereby position said reservoir and piston elements longitudinally relative to each other.

5. A hydraulic positioning device for positioning a piston element longitudinally relative to a reservoir element comprising a reservoir element for containing fluid, a piston element in said reservoir element, longitudinally extending groove means on one of said elements for passing liquid from one side to the other of said piston element upon relative longitudinal movement between said elements, an ungrooved portion on said one element spacing said groove means longitudinally, seal means on the other of said elements for sealingly engaging said ungrooved portion upon relative longitudinal movement between said elements in one direction to thereby seal off between said elements and position said piston element in a position relative to said reservoir element, and a bypass with check valve means in one of said elements for bypassing liquid around said seal means and ungrooved portion for permitting relative longitudinal movement of said elements in the other direction.

6. A hydraulic positioning device for positioning a piston element longitudinally relative to a reservoir element comprising a reservoir element for containing fluid, a piston element in said reservoir element, longitudinally extending groove means on one of said elements for passing liquid from one side to the other of said piston element upon relative longitudinal movement between said elements, ungrooved portions on said one element spacing said groove means longitudinally, seal means on the other of said elements for sealingly engaging an ungrooved portion upon relative longitudinal movement between said elements in one direction to thereby seal off between said elements and position said piston element in a position relative to said reservoir element, and a bypass valve means in one of said elements for bypassing liquid around said seal means and ungrooved portion for permitting relative longitudinal movement of said elements in either direction.

7. A hydraulic positioning device for positioning a piston element longitudinally relative to a reservoir element comprising a reservoir element for containing fluid, a piston element in said reservoir element, longitudinally extending groove means on one of said elements for passing liquid from one side to the other of said piston element upon relative longitudinal movement between said elements, an ungrooved portion on said one element spacing said groove means longitudinally, seal means on the other of said elements for sealingly engaging said ungrooved portion upon relative longitudinal movement between said elements in one direction to thereby seal off between said elements and position said piston element in a position relative to said reservoir element, and a bypass with check valve means in one of said elements for bypassing liquid around said seal means and ungrooved portion for permitting relative longitudinal movement of said elements in the other direction, said seal means on the other of said elements being inclined at an angle relative to the longitudinal axis of said other element so that relative rotation between said elements moves said seal means across said grooved means on said one element to break the seal between said elements and thereby permit relative longitudinal movement of said elements in either direction.

8. In a hydraulic lock for locking members together wherein, one member includes a liquid reservoir, another member includes a piston element in said reservoir, longitudinally extending groove means in the reservoir for the passage of displaced liquid upon relative longitudinal movement between said members, longitudinally spaced ungrooved portions in said reservoir separating said groove means, spaced seal means on said piston engageable with said spaced ungrooved portions for forming a fluid lock between the members to hold them in a position against movement in either longitudinal direction from the positions, and at least a portion of each of said spaced seal means on the piston being in a plane inclined relative to the longitudinal axis of the piston whereby rotation between the piston and reservoir positions said seal means across said groove means to break the fluid lock for relative longitudinal movement between the piston and reservoir.

9. A hydraulic mechanism for positioning members together at a plurality of longitudinally spaced positions comprising a first member, there being a fluid reservoir therewith, a second member, a piston element associated therewith and in said reservoir, hydraulic bypass means in said piston and reservoir bypassing liquid upon relative longitudinal movement of said members between the positions, and spaced seal means on said piston and reservoir respectively sealingly engageable at the longitudinally spaced positions forming a hydraulic lock between said piston element and reservoir to hold them against movement in either direction longitudinally from the position, portions of each of said spaced seal means on said piston being in a plane inclined at an angle relative to the longitudinal axis of said piston so that relative rotation between said elements disengages said sealing means and opens said hydraulic bypass means to permit relative longitudinal movement of said elements in either direction.

10. A hydraulic lock and unlocking device for holding members against relative movement in either longitudinal direction which is operable upon relative rotation between the members to release the members for relative movement in either longitudinal direction comprising a first member, there being a liquid containing reservoir element therewith, a second member, a piston element associated therewith and movable in said reservoir, longitudinally extending groove means in said reservoir for the passage of displaced liquid upon relative longitudinal movement between said members, spaced ungrooved portions in said reservoir separating said groove means, spaced annular sealing means on said piston element engageable with adjacent ungrooved portions on said reservoir to form a fluid lock between said members to hold them in a position against movement in either longitudinal direction from the position, spaced spring loaded one-way valve liquid conducting means in said piston element, each of said valve means opening outwardly of the piston element at opposite end thereof for bypassing liquid around said annular means and ungrooved portions, and a portion of said spaced seal means being inclined at an angle relative to the longitudinal axis of said piston so that relative rotation between the said piston and reservoir moves said piston seal means across said groove means and thereby unlocks said members for relative longitudinal movement.

11. A hydraulic locking device for relatively longitudinally movable members comprising a hydraulic reservoir element connected to one of the members, a piston element within said reservoir element connected to the other member, hydraulic bypass means in one of said elements for bypassing liquid past the piston element upon relative longitudinal movement between said piston and reservoir elements, and sealing means on said piston and reservoir elements engageable for hydraulically locking said elements against relative longitudinal movement in either longitudinal direction, portion of said sealing means in a plane on one of said elements being inclined at an angle relative to the longitudinal axis of said one element so that relative rotation between said elements disengages said sealing means and opens said hydraulic bypass means to permit relative longitudinal movement of said elements in either direction.

12. Apparatus for hydraulically locking and unlocking a piston element in a fluid containing reservoir element to control relative longitudinal movement between the elements comprising longitudinal spaced groove means extending longitudinally of the reservoir element whereby the piston element may move in the fluid reservoir element by displacing fluid there past through said groove means upon longitudinal relative movement between the piston element and the reservoir element, annular seal means on the piston element, an ungrooved portion on the reservoir element between said spaced groove means engageable with said seal means on the piston element for forming a fluid lock between the piston element and reservoir element to lock the elements against relative longitudinal movement, a portion of said seal means in a plane, extending at an angle relative to the longitudinal axis of the piston element whereby relative rotation between the elements moves said seal means on the piston element across groove means on the reservoir element and unlocks the elements for relative longitudinal movement.

13. A hydraulic mechanism for positioning members together at a plurality of longitudinally spaced positions comprising a first member, there being a fluid reservoir therewith, a second member, a piston element associated therewith and in said reservoir, hydraulic bypass means in said piston and reservoir bypassing liquid upon relative longitudinal movement of said members between the positions, and spaced seal means on said piston and reservoir respectively at the longitudinally spaced positions forming a hydraulic lock between said piston element and reservoir to hold them against movement in either direction longitudinally from the position, said seal means on said piston and reservoir being positioned in planes at an angle relative to each other to disengage upon relative rotation between the reservoir and piston element to break the fluid lock therebetween and thereby permit relative longitudinal movement between the first and second member.

14. A hydraulic lock and unlocking device for holding members against relative movement in either longitudinal direction which is operable upon relative rotation between the members to release the members for relative movement in either longitudinal direction comprising a first member, there being a liquid containing reservoir element therewith, a second member, a piston element associated therewith and movable in said reservoir, longitudinally extending groove means in said reservoir for the passage of displaced liquid upon relative longitudinal movement between said members, spaced ungrooved portions in said reservoir separating said groove means, spaced annular sealing means on said piston element engageable with adjacent ungrooved portions on said reservoir to form a fluid lock between said members to hold them in a position against movement in either longitudinal direction from the position, spaced one-way valve liquid conducting means in said piston element, each of said valve means opening outwardly of the piston element at opposite end thereof for bypassing liquid around said annular seal means and ungrooved portions, and a portion of said spaced seal means being inclined at an angle relative to the longitudinal axis of said piston so that relative rotation between the said piston and reservoir moves said piston seal means across said grooved portions and thereby unlocks said members for relative longitudinal movement.

15. Apparatus for hydraulically locking a piston element against longitudinal movement in a fluid reservoir element comprising cooperating annular seal means on the piston and reservoir elements engageable for forming a fluid lock therebetween to hydraulically lock the elements against relative longitudinal movement, fluid bypass means in one of the elements to bypass fluid relative to the piston, and at least portions of said cooperating seal means being positioned on said elements at an angle inclined relative to each other to disengage upon relative rotation between the elements to break the fluid lock between the elements and open said fluid bypass means to thereby permit relative longitudinal movement between the elements.

16. Apparatus for hydraulically locking and unlocking a piston element in a fluid reservoir element to control relative longitudinal movement between the elements comprising groove means extending longitudinally of the reservoir element, seal means on the piston element, said longitudinally extending groove means being spaced from adjacent groove means to form ungrooved portions in the reservoir element which function as seal means to sealably engage with said seal means on the piston element to form a hydraulic lock between said piston element and reservoir element, and said seal means extending at an angle relative to the longitudinal axis of the piston element whereby relative rotation between the elements moves said seal means on the piston element across said grooved portion on the reservoir element and unlocks the elements for relative longitudinal movement.

17. A hydraulic locking device for locking a piston element in a position in a liquid reservoir element and against movement in either direction from the position including, hydraulic bypass means for bypassing liquid relative to the piston element upon longitudinal movement of the piston element in the reservoir element to the position, said bypass means including longitudinally extending groove means in one of the elements, an ungrooved portion adjacent each end of said groove means and spaced seal means on the other element which define the position at which the piston and reservoir elements are locked against movement, and said seal means sealingly engageable with said ungrooved portions when the piston element is moved to the position in the reservoir element to lock the piston element against movement in the reservoir element in either longitudinal direction from the position.

18. A hydraulic locking device for locking and unlocking a piston element in a position longitudinally relative to a liquid reservoir element including, hydraulic bypass means for bypassing liquid relative to the piston element upon longitudinal movement of the piston element in the reservoir element to the position, said bypass means including longitudinally extending groove means in one of the elements, an ungrooved portion adjacent each end of said groove means and spaced seal means on the other element which define the position at which the piston and reservoir elements are locked against movement, and said seal means sealingly engageable with said ungrooved portions when the piston element is moved to the position in the reservoir element to lock the piston element against movement in the reservoir element in either longitudinal direction from the position, and at least a part of said seal means on the other element being in a plane inclined relative to the longitudinal axis of the other element whereby relative rotation between the elements moves said seal means across a grooved portion and unlocks the elements for relative longitudinal movement from the position.

19. A hydraulic positioning device for positioning a piston longitudinally in a hydraulic cylinder against longitudinal movement in one direction relative to the hydraulic cylinder comprising longitudinally extending groove means in the cylinder wall for bypassing liquid past the piston upon relative longitudinal movement between the piston and cylinder, an ungrooved portion in the cylinder adjacent said groove means, a one-way valve means in said piston for bypassing liquid in one direction from one side of the piston to permit relative longitudinal movement between the cylinder and piston in one direction, and seal means on the piston for sealingly engaging said ungrooved portion in the cylinder to prevent liquid from bypassing past the piston whereby the piston may be moved in one direction when it is in engagement with said ungrooved portion, and is locked against movement in the other direction to thereby position the piston in the cylinder.

20. A hydraulic positioning device for positioning a piston longitudinally in a hydraulic cylinder against longitudinal movement in one direction relative to the hydraulic cylinder comprising, longitudinally extending groove means in the cylinder for bypassing liquid around the piston upon relative longitudinal movement between the piston and cylinder, an ungrooved portion in the cylinder adjacent one end of said groove means, and lip seal means on the piston bypassing liquid around said piston in only one direction whereby the piston may be moved in one direction when in engagement with said ungrooved portion and is locked against movement in the other direction, to thereby position the piston in the cylinder.

21. A hydraulic locking device for locking a piston in a position in a reservoir and against movement in either longitudinal direction from the position comprising a hydraulic reservoir element, a piston element within said reservoir element, spaced sealing means on said piston element, and spaced seal means on said reservoir element, which define the position at which said piston and reservoir elements are locked against movement, hydraulic bypass means in one of said elements for bypassing liquid relative to said piston element upon movement of said piston in the reservoir element to the position therein, said spaced sealing means on each of said elements sealingly engaging when said piston element is moved to the position in the reservoir to lock said piston in said reservoir against further longitudinal movement in either direction from the position.

References Cited in the file of this patent

UNITED STATES PATENTS

| | | |
|---|---|---|
| 228,555 | Pike | June 8, 1880 |
| 763,285 | Herman | June 21, 1904 |
| 1,141,310 | Bradburn | June 1, 1915 |
| 1,551,372 | Crocker | Aug. 25, 1925 |
| 1,567,515 | Kijima et al. | Dec. 29, 1925 |
| 1,584,884 | Merrick | May 18, 1926 |
| 2,064,527 | Ericsson | Dec. 15, 1936 |
| 2,178,540 | McNeese et al. | Nov. 7, 1939 |
| 2,227,731 | Lynes | Jan. 7, 1941 |
| 2,577,068 | Baker | Dec. 4, 1951 |
| 2,737,246 | Moosman | Mar. 6, 1956 |